Dec. 5, 1961 L. B. CONNER, JR 3,011,713

CROSS-CORRELATOR

Filed June 30, 1958 2 Sheets-Sheet 1

INVENTOR.

Leo B. Conner, Jr.

BY

D. K. Sadler

ATTORNEY

INVENTOR.
Leo B. Conner, Jr.

United States Patent Office 3,011,713 Patented Dec. 5, 1961

3,011,713

CROSS-CORRELATOR

Leo B. Conner, Jr., Flint, Mich., assignor to General Motors Corporation, Detroit, Mich., a corporation of Delaware Filed June 30, 1958, Ser. No. 745,765
3 Claims. (Cl. 235—181)

The present invention relates to means for automatically correlating the displacement between two similar signals containing random variations which are displaced from each other by varying amounts.

It is frequently desirable to correlate a pair of similar signals which are displaced from each other. Although numerous means have been suggested for accomplishing this objective, they have not been entirely satisfactory, particularly when the two similar signals contain low frequency random variations that are displaced by a considerable amount from each other. It is now proposed to provide means for automatically and continuously cross-correlating a pair of displaced similar signals.

In the present instance the correlator is particularly adapted for cross-correlating a pair of signals having comparatively low frequency random variations with the corresponding variations in the two signals being widely displaced from each other. More particularly, this is to be accomplished by recording the leading signal on a moving member and reproducing a recorded signal at a subsequent time. The delay in reproducing the signal may be varied until the reproduced signal corresponds with the trailing signal. When this condition exists the delay in reproducing the signal will correspond to the original displacement between the two original signals. In order to facilitate recording the low frequency variations, a carrier signal is frequency modulated to correspond to the variations in the leading signal and is then magnetically recorded on an endless track. Reproducing means are movably disposed posterior to the recording means so as to subsequently reproduce the recorded signals. The reproduced signal is then frequency demodulated to provide a signal identical to the original signal but displaced therefrom by an amount corresponding to the spacing between the recording means and the reproducing means. The reproducing means preferably includes a pair of displaced heads to provide two reproduced signals that are out of phase. These signals may then be compared to the original trailing signal for producing an error signal indicative of the displacement between the trailing signal and the reproduced signal. This error signal is then effective to actuate a servo control that positions the reproducing heads until the error signal is minimized and the trailing signal and the reproduced signal are being properly correlated with each other. Thus the position of the reproducing means relative to the recording means will be indicative of the displacement between the leading and trailing signals . Normally, when the displacement between the two signals is comparatively small, the random variations will contain a larger proportion of higher frequency vibrations and as the displacement increases, the proportion of lower frequency vibrations will increase. Accordingly, in order to vary the bandwith of the cross-correlation to correspond to the signals being correlated, it is desirable for the spacing between the two reproducing heads to vary directly with the displacement between the signals.

Figure 1:
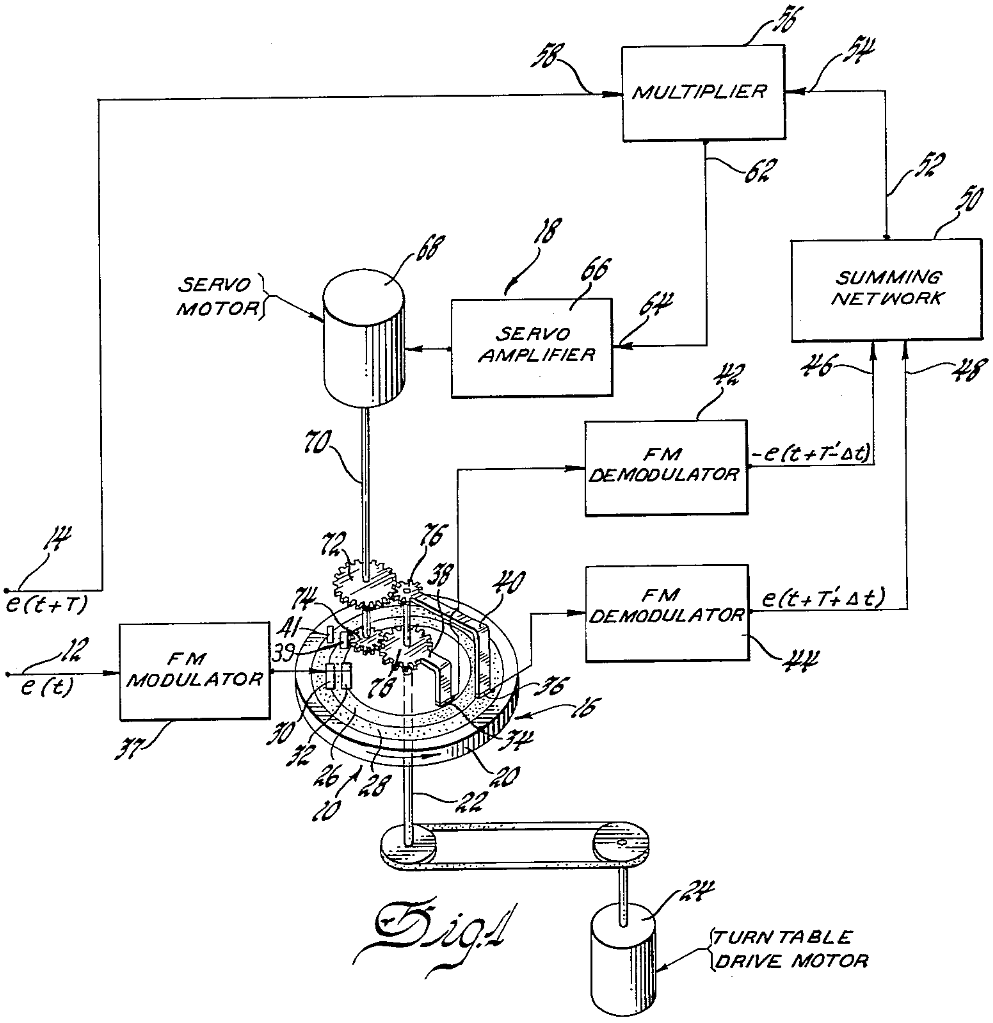
FIGURE 1 is a diagrammatic representation of signal correlating means embodying the present invention.
Figure 2:
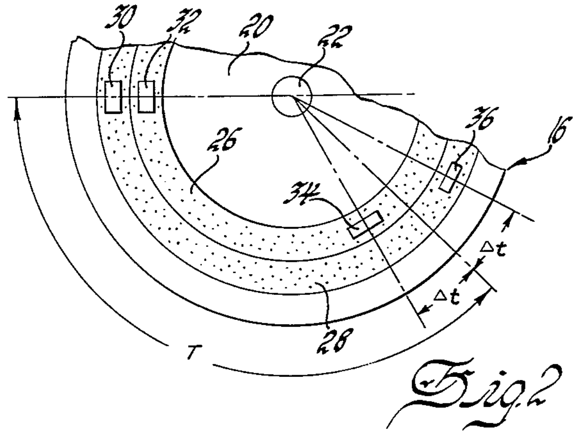
FIGURE 2 is a schematic view of a portion of the correlating means of FIGURE 1.

Referring to the drawing in more detail, the present invention is embodied in a correlator 10 particularly adapted for correlating a leading signal $e(t)$ with a trailing signal $e(t+T)$ which is displaced therefrom by an unknown time interval T. This correlator 10 includes a pair of inputs 12 and 14 that are adapted to receive the leading and trailing signals, recording means 16 and servo positioning means 18. The recording means 16 includes a turntable 20 that rotates about the axis of a vertical shaft 22 belt driven by a constant speed motor 24. The turntable 20 includes a pair of concentric recording tracks 26, 28 thereon which are particularly adapted to have signals magnetically recorded thereon. A pair of fixed recording heads 30, 32 are mounted over the turntable 20 so as to simultaneously record identical signals on both of the tracks 26, 28. In addition, a pair of independent reproducing heads 34, 36 are mounted on a pair of separate arms 38, 40 that are free to swing about an axis coincident with the axis of the turntable 20. A pair of fixed erasing heads 39 and 41 coact respectively with the tracks 26 and 28 in advance of the recording heads 30 and 32. It may thus be seen that the reproducing heads 34, 36 will scan the two tracks 26, 28 and separately reproduce the signals recorded thereon.

The first input 12 which is adapted to receive the leading signal $e(t)$ is directly interconnected with a modulator 37 effective to frequency modulate a carrier in proportion to the random variations in the signal $e(t)$. The output of the modulator 37 is interconnected with the two recording heads 30 and 32 so that the frequency modulated signal will be continuously recorded on both tracks 26 and 28 as they pass under the recording heads 30 and 32.

The reproducing heads 34 and 36 for retrieving the recorded signals are each interconnected directly with the inputs to a pair of frequency demodulators 42 and 44 so as to feed the reproduced frequency modulated signals thereto. Both of these demodulators 42 and 44 are substantially identical with each other except that the output of the first demodulator 42 is inverted from the other one. These demodulators 42 and 44 are adapted to frequency demodulate the reproduced signals. Thus the outputs therefrom will include signals $-e(t+T'-\Delta t)$ and $e(t+T'+\Delta t)$ respectively. These signals will be identical to the original leading signal $e(t)$ except they will be displaced therefrom by $T'\pm\Delta t$ where T' is the displacement between the recording heads 30 and 32 and the midpoint between the reproducing heads 34 and 36 and $\Delta t$ is the distance between the midpoint and the reproducing heads 34 and 36. It should be noted that if the variations in the original signals supplied to the inputs 12 and 14 are of sufficiently high frequency, they may be recorded and reproduced by conventional audio techniques.

The outputs of the two frequency demodulators 42 and 44 are interconnected with the inputs 46 and 48 to a summing network 50. This network 50 algebraically combines the signals from the two demodulators 42 and 44. The output 52 of the summing network 50 is, in turn, interconnected with an input 54 to a multiplier circuit 56. Another input 58 of the multiplier circuit 56 receives the original trailing signal $e(t+T)$.

The multiplier 56 is adapted to multiply the two signals and thereby produce an error signal in the output 62 thereof. This output 62 is interconnected with the input 64 to a servo amplifier 66 which, in turn, is effective to control a servo motor 68. The output shaft 70 of the servo motor 68 includes a pair of gears 72 and 74 that mesh with gears 76 and 78 on the arms 38 and 40 carrying the reproducing heads 34 and 36. Thus the servo motor 68 will be effective to rotate the support arms 38 and 40 about the axis of the shaft 70 and move the reproducing heads 34 and 36 circumferentially around the turntable 20 toward or away from the recording heads 30 and 32. It should be noted that the gear drives for positioning the arms 38 and 40 around the circumference of the turntable 20 include different ratios. Thus the servo motor 68 will cause one of the arms to move at a greater rate than the other arm. As a result, it may be seen that the spacing between the two reproducing heads 34 and 36 will vary as the displacements thereof vary.

When the correlator 10 is in operation the leading signal $e(t)$ will be supplied to the first input 12 and the trailing signal $e(t+T)$ will be supplied to the second input 14. These signals will contain fluctuations or variations which are substantially identical to each other but are displaced from each other by T. The leading signal will be fed into the FM modulator 37 which will frequency modulate a carrier in proportion to any variations in the leading signal. This frequency modulated signal will then be supplied to the recording heads 30 and 32 so as to simultaneously be recorded on both of the signal tracks 26 and 28 as the turntable 20 rotates therepast. These recordings will travel with the tracks 26 and 28, as the turntable 20 rotates, and eventually pass under both of the reproducing heads 34 and 36. These heads 34 and 36 will then reproduce signals corresponding to the signals previously recorded by the recording heads 30 and 32. However, it is apparent that the reproduced signals will be displaced from the original signal by an amount proportional to the circumferential distance between the reproducing heads 34 and 36 and recording heads 30 and 32. Each of the reproduced signals will then be supplied to the frequency demodulators 42 and 44. The output from the first demodulator 42 will be $-e(t+T'-\Delta t)$ and the output from the second demodulator 44 will be $e(t+T'+\Delta t)$ where T' is the displacement from the recording heads 30 and 32 to the midpoint between the reproducing heads 34 and 36 and $\Delta t$ is the displacement between the midpoint and the reproducing heads 34 and 36. The two demodulated signals are then fed to the inputs 46 and 48 of the summing network 50 where they are algebraically combined with each other. The resultant signal is then fed into the multiplier circuit 56 where it is multiplied by the original trailing signal to produce an error signal. This error signal will be a maximum negative amount when the trailing signal is in phase with the demodulated output from the first demodulator 42 and a maximum positive amount when it is in phase with the demodulated output of the second demodulator 44. The servo amplifier 66, which is responsive to the error signal, will actuate the servo motor 68 to maintain the recording heads 30 and 32 positioned so that the multiplier output will be a null. When this condition is obtained the angular disposition of the midpoint between the reproducing heads 34 and 36 relative to the recording heads 30 and 32 will be indicative of the displacement between the two input signals.

Figure 3:
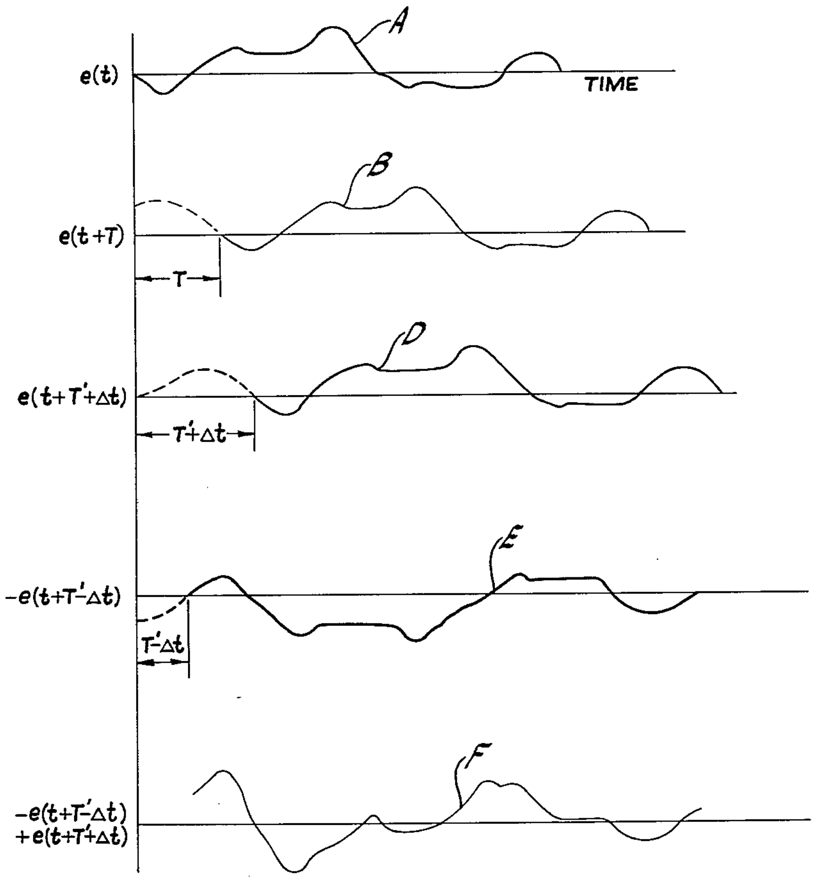
FIGURE 3 is a graphical representation of typical signals.
Figure 4:
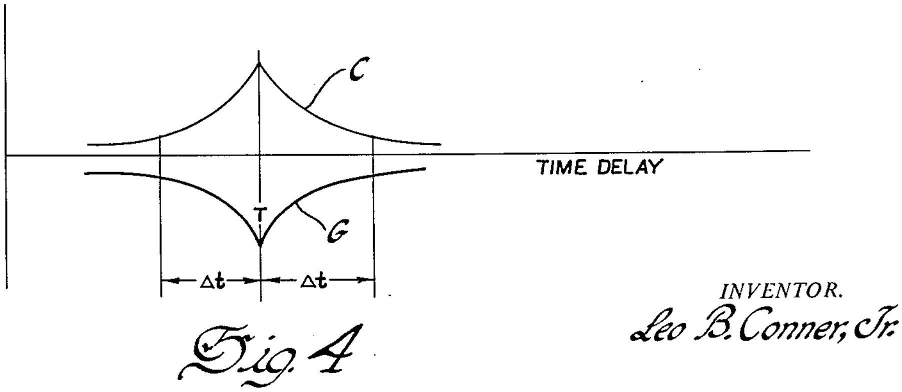
FIGURE 4 is a graphical representation of auto-correlation functions.

The operation of the cross-correlator may be explained in greater detail with reference to well known auto-correlation principles which have been fully described in the literature. A somewhat simplified explanation of the principles involved will be given with reference to the graphical representations of FIGURES 3 and 4. Consider a random signal $e(t)$ represented by the curve A which is a non-periodic amplitude function of time over a prescribed time interval and a signal $e(t+T)$ represented by the curve B, of the same waveform but occurring later in time by the interval T. It is desired to compare these two signals to ascertain the difference in time between the occurrence of the same signal content, i.e., the time delay of the trailing signal B with reference to the leading signal A. It is well known that if the waveforms of curves A and B are identical, the integral of the product of the two curves, within given time limits, varies as the auto-correlation function which is graphically represented by the curve C having a single maximum when the leading signal $e(t)$ is delayed by the period T so that it coincides in time with the trailing signal $e(t+T)$. As the time displacement between the two curves increases, the value of the auto-correlation function decreases.

Thus with the two signals represented by curves A and B which are known to have the same waveform but displaced in time by an unknown interval T, the time displacement is determined by the inventive system as follows. The signal $e(t)$ is subjected to a time delay of $T'+\Delta t$ to produce the waveform D. This is accomplished by passing the signal through the modulator 37 to the recording head 30 where it is impressed upon the track 28 and retrieved by the reproducing head 36 and then demodulated by the demodulator 44. Similarly, the signal $e(t)$ is subjected to a time delay of $T'-\Delta t$ to produce the waveform E by applying the signal through the modulator 37 to the recording head 32, thence to the track 26, and the reproducing head 34 from whence the signal is applied to the demodulator 42 which not only recovers the signal from the modulated carrier but also inverts it to develop the output signal $-e(t+T'-\Delta t)$. The two signals represented by the waveforms D and E are algebraically added by the summing network 50 to produce the resultant signal of waveform F. This waveform F is applied to the multiplier 56 in which it is multiplied with the trailing signal $e(t+T)$. The product of these two signals is then applied to the servo amplifier which controls the energization of the servo motor 68 in accordance with the error signal and positions the pick-up heads accordingly.

It will now be apparent that if the time delay $T'+\Delta t$ (to produce the waveform D) is equal to the time interval T, the signal reproduced by the head 36 and demodulator 44 will have a zero time displacement from the signal represented by waveform B and thus the auto-correlation function C is at its maximum value. However, if the time delay $T'-\Delta t$ (to produce the waveform E) is equal to the time interval T, the signal reproduced by the head 34 and demodulator 42 will have a zero time displacement from the signal represented by waveform B and due to the inversion in the demodulator, a maximum negative output is developed as represented by the auto-correlation function G. Although the signals represented by curves D and E are not separately multiplied by the signal B, but instead are algebraically combined to produce a signal represented by curve F which is multiplied by the signal B, the product is the same as the sum of the individual products. Consequently, the error signal developed by the multiplier 56 is of positive value when the time delay $T'+\Delta t$ is equal to T and is of negative value when the time delay $T'-\Delta t$ is equal to T. The error signal can be reduced to zero only when the product of the signal represented by curves D and B is equal and opposite to the product of the signal represented by curves E and B. It can be seen from FIGURE 4 that this occurs when the pick-up heads are positioned by equal time delay increments on opposite sides of the position corresponding to the time delay T of the trailing signal. This positioning is accomplished automatically by the servo motor in reducing the error signal to zero.

Normally when the displacement of the two signals is comparatively small, the random variations in the signals will contain a larger portion of higher frequency components and, as the displacement between the two signals increases, the proportion of the lower frequency components will increase. In order to compensate for this characteristic, the gear ratios driving the playback heads 34 and 36 are such that the distance $2\Delta t$ between the two playback heads 34 and 36 decreases as the displacement decreases. This will insure the correlator 10 always having an adequate band spread to be able to correlate the two signals while at the same time preventing $\Delta t$ exceeding 90 degrees for the higher frequency components of the signal inputs.

What is claim is:

1. In a system for cross-correlating a leading signal with a trailing signal of similar waveform to determine the time displacement therebetween, the combination comprising a recording medum, recording means coacting with said recording medium, means for relatively displacing the recording medium and recording means at a constant velocity, means for applying said leading signal to the recording means, a pair of signal reproducing devices coacting with said recording medium and being spaced along said medium from the recording means to reproduce the leading signal with a time delay proportional to the displacement from the recording means, combining means adapted to receive said trailing signal and being connected with the pair of reproducing devices for developing an error signal corresponding to the summation of the time delayed leading signals from the reproducing devices multiplied by the trailing signal, servo means connected with the combining means and connected with said reproducing devices and being responsive to the error signal to displace the reproducing devices relative to the recording means until the error signal is reduced to null, said servo means including driving means connected with the reproducing devices for increasing the spacing therebetween in accordance with the displacement of the reproducing devices from the recording means whereby the effective bandwidth of the system is increased as time delay of the leading signal is increased.

2. In a system for cross-correlating a leading signal with a trailing signal of similar waveform to determine the time displacement therebetween, the combination comprising a pair of continuous recording tracks, recording means coacting with both of said recording tracks, means for relatively displacing the recording tracks and recording means at a constant velocity, means for applying said leading signal to said recording means, a pair of signal reproducing devices coacting respectively with said tracks and being spaced along said tracks from the recording means to reproduce the leading signal with a time delay proportional to the displacement from the recording means, combining means adapted to receive said trailing signal and being connected with the pair of reproducing devices for developing an error signal corresponding to the summation of the time delayed leading signals from the reproducing devices multiplied by the trailing signal, servo means connected with the combining means and said reproducing devices and being responsive to the error signal to displace the reproducing devices relative to the recording means until the error signal is reduced to null, said servo means including driving means with a gear train of one ratio connected to one reproducing device and a gear train of another ratio connected to the other reproducing device for increasing the spacing between said devices in accordance with the displacement of the reproducing devices from the recording means whereby the effective bandwidth of the system is increased as time delay of the leading signal is increased.

3. In a system for cross-correlating a leading signal with a trailing signal of similar waveform to determine the time displacement therebetween, the combination comprising a pair of continuous recording tracks, a pair of recording devices coacting respectively with said recording tracks, means for relatively displacing the recording tracks and recording means at a constant velocity, means for frequency modulating a carrier wave in accordance with said leading signal and for applying the modulated carrier wave to the pair of recording devices, a pair of signal reproducing devices coacting respectively with said tracks and being spaced along said tracks from the recording means to reproduce the modulated carrier wave with a time delay proportional to the displacement from the recording devices, a first demodulator means connected with one of the reproducing devices for developing a demodulated time delayed leading signal, a second demodulator means connected with the other reproducing device for developing a demodulated and inverted time delayed leading signal, combining means adapted to receive said trailing signal and being connected with the first and second demodulating means for developing an error signal corresponding to the summation of the time delayed leading signals multiplied by the trailing signal, servo means connected with the combining means and with one of said pairs of devices and being responsive to the error signal to relatively displace the reproducing devices and the recording devices until the error signal is reduced to null, said servo means including driving means connected with the reproducing devices for increasing the spacing therebetween in accordance with the displacement of the reproducing devices from the recording devices whereby the effective bandwidth of the system is increased as time delay of the leading signal is increased.

References Cited in the file of this patent

UNITED STATES PATENTS

| | | |
|---|---|---|
| 2,439,446 | Begun | Apr. 13, 1948 |
| 2,688,124 | Doty et al. | Aug. 31, 1954 |
| 2,800,654 | De Rosa | July 23, 1957 |
| 2,866,373 | Doyle et al. | Dec. 30, 1958 |
| 2,918,581 | Willey et al. | Dec. 22, 1959 |